(12) United States Patent
Bancel

(10) Patent No.: US 9,331,847 B2
(45) Date of Patent: May 3, 2016

(54) COUNTERMEASURE METHOD AND DEVICE FOR PROTECTING DATA CIRCULATING IN AN ELECTRONIC COMPONENT

(75) Inventor: Frédéric Bancel, Senas (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 263 days.

(21) Appl. No.: 13/416,736

(22) Filed: Mar. 9, 2012

(65) Prior Publication Data
US 2012/0174234 A1 Jul. 5, 2012

Related U.S. Application Data

(63) Continuation-in-part of application No. PCT/IB2010/002069, filed on Aug. 24, 2010.

(30) Foreign Application Priority Data

Aug. 27, 2009 (FR) ...................................... 09 04072

(51) Int. Cl.
G06F 21/00 (2013.01)
H04L 9/00 (2006.01)

(52) U.S. Cl.
CPC ............ *H04L 9/002* (2013.01); *H04L 2209/08* (2013.01); *H04L 2209/12* (2013.01)

(58) Field of Classification Search
CPC ........... H04L 9/003; H04L 9/00; H04L 9/002; H04L 2209/08; H04L 2209/04; G06F 2207/7219; G06F 21/72

USPC ............................................................ 726/26
See application file for complete search history.

(56) References Cited

U.S. PATENT DOCUMENTS

| | | | |
|---|---|---|---|
| 5,204,901 A * | 4/1993 | Hershey et al. ................ | 380/285 |
| 6,690,733 B1 * | 2/2004 | Baumgartner et al. ........ | 375/259 |
| 6,820,814 B1 * | 11/2004 | Benoit ........................... | 235/487 |
| 6,934,388 B1 * | 8/2005 | Clark .............................. | 380/47 |
| 7,085,378 B1 * | 8/2006 | Clavier et al. .................. | 380/42 |
| 2001/0025344 A1 * | 9/2001 | Teglia ............................ | 713/200 |
| 2007/0050696 A1 * | 3/2007 | Piersol et al. ................. | 715/500 |
| 2009/0182918 A1 * | 7/2009 | Hollis ........................... | 710/106 |

FOREIGN PATENT DOCUMENTS

| | | |
|---|---|---|
| EP | 1109103 A1 | 6/2001 |
| JP | 10-049048 A | 2/1998 |
| WO | 00/01111 A1 | 1/2000 |
| WO | 00/19385 A1 | 4/2000 |

* cited by examiner

*Primary Examiner* — Jeffery Williams
*Assistant Examiner* — Christopher C Harris
(74) *Attorney, Agent, or Firm* — Seed IP Law Group PLLC

(57) ABSTRACT

The disclosure relates to a countermeasure method in an electronic component, wherein binary data are transmitted between binary data storage units, binary data being transmitted in several transmission cycles comprising a first cycle comprising: randomly selecting bits of the data, transmitting the selected bits and transmitting bits, each having a randomly chosen value, instead of transmitting non-selected bits of the data. A last transmission cycle comprises transmitting bits of the data that have not been transmitted during a previous cycle.

17 Claims, 3 Drawing Sheets

COUNTERMEASURE METHOD AND DEVICE FOR PROTECTING DATA CIRCULATING IN AN ELECTRONIC COMPONENT

BACKGROUND

1. Technical Field

The present disclosure relates to a countermeasure method for protecting sensitive data circulating in an electronic component against attacks aiming to discover these data. It also relates to a portable device with a microcircuit such as a chip card, implementing the method.

2. Description of the Related Art

Sensitive data may notably be encryption or decryption keys, and more generally cryptographic data used or developed during cryptographic calculations, such as the intermediary data of such calculations, and identifiers which are desirable to be kept secret.

Microcircuit devices handling sensitive data are sometimes the object of attacks aiming to determine these data. Among the known types of attacks, attacks of the type SPA (Simple Power Analysis) or DPA (Differential Power Analysis) consist of measuring the currents and voltages going into and coming out of the microcircuit during its execution of a program, with the aim of determining the protected data treated or used by the microcircuit. With this same goal, attacks of the type EMA (Electromagnetic Analysis) are based upon the analysis of electromagnetic radiation emitted by the microcircuit.

Also known are fault injection attacks, which consist of introducing disruptions into the microcircuit while it is executing sensitive algorithms such as cryptographic algorithms, or with the aim of launching an uploading routine that emits, upon one of the ports, data that is memorized. Such a disruption may be done by applying to the microcircuit, on one of its contacts, one or more brief lightings or voltage peaks.

In order to fight against such varied attacks, numerous solutions of different types have been developed. The disclosure relates in particular to those which aim to protect data while they are circulating in a microcircuit.

To this effect, it is known to encrypt each sensitive data at the output of a memory or register or before it is transmitted on a data bus, and to decrypt the data at the input of a memory or register or when it arrives at its destination. It turns out that this solution only provides a partial protection of transmitted data, given that between the output of the decryption mechanism and the input of the memory or register, the data circulate in circuits such as logical gates and multiplexers that produce a signature that is visible to EMA or SPA type attacks. A writing operation in the memory or the register may also emit a signature.

It is also known to precharge a register that is to receive a sensitive data with a randomly generated data in order to change the state of certain memory cells, and thus to modify the signature emitted during the writing in the register. This solution has the inconvenience of necessitating a supplementary instruction in order to perform the precharge.

BRIEF SUMMARY

Embodiments of the present invention relate to a countermeasure method in an electronic component, wherein binary data are transmitted between binary data storage units, and a binary data is transmitted over several transmission cycles comprising a first cycle comprising the steps of: randomly selecting bits of the data; transmitting the selected bits; and transmitting bits, each having a randomly chosen value, instead of non-selected bits of the data, a last transmission cycle comprising a step of transmission of bits of the data that have not been transmitted during a previous cycle.

According to one embodiment, the binary data is transmitted to a data input of a combinatory logic circuit of the electronic component, the last cycle comprising the transmission of all the bits of the data to the combinatory logic circuit.

According to one embodiment, the data is transmitted by a transmission line of the electronic component, the last cycle comprising the transmission of bits, each having a randomly chosen value, instead of bits of the data not transmitted during the last cycle.

According to one embodiment, the first cycle comprises a step of inverting bits, before their transmission, chosen randomly from among the bits of the data selected, and the last cycle comprises a step of inverting bits of the data, which were inverted and transmitted during a previous cycle.

According to one embodiment, the number of transmission cycles of the data is equal to two and the number of bits of the data transmitted during each cycle is chosen randomly to be around half of the bits of the data.

Embodiments of the present disclosure also relate to a countermeasure device in an electronic component, wherein the binary data are transmitted between binary data storage units, and configured to implement the method according to one of the above embodiments.

According to one embodiment, the device comprises a scrambling unit receiving a data to transmit, configured to select randomly and transmit bits of a data to transmit, and to transmit bits, each having a randomly chosen value, instead of non-selected bits of the data.

According to one embodiment, the scrambling unit is connected to a data transmission line.

According to one embodiment, the scrambling unit is connected to a data input of a combinatory logic circuit.

According to one embodiment, the device comprises a descrambling unit configured to receive bits transmitted by a data transmission line and to reconstitute a transmitted data from bits transmitted over several transmission cycles, and a control unit of the scrambling and descrambling units.

According to one embodiment, the scrambling unit comprises a bit inversion unit to invert bits, selected among the bits selected to be transmitted of the data to transmit, the descrambling unit comprising a bit inversion unit to invert bits of a data transmitted having been inverted by the scrambling unit during a previous transmission cycle.

Embodiments of the present disclosure also relate to an electronic component comprising a countermeasure device according to one the above embodiments.

According to one embodiment, the electronic component comprises a data transmission line, the countermeasure device comprising units of scrambling and of descrambling connected to the data transmission line.

According to one embodiment, the electronic component comprises a combinatory logic circuit and a scrambling unit connected to a data input of the combinatory logic circuit.

Embodiments of the present disclosure also relate to a portable microcircuit device comprising an electronic component according to one of the above embodiments.

BRIEF DESCRIPTION OF THE SEVERAL VIEWS OF THE DRAWINGS

Example embodiments of the disclosure will be described in the following description, in a non-limiting manner in relation with the appended figures wherein.

DETAILED DESCRIPTION

Figure 1:
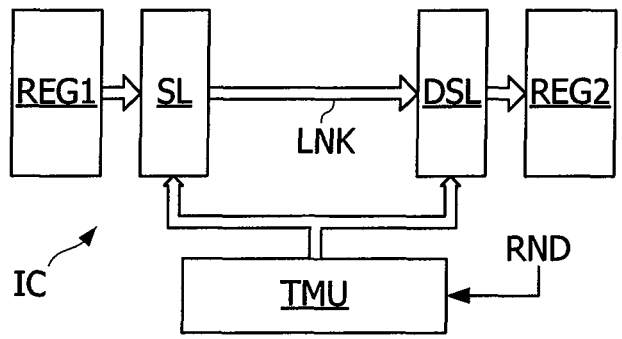
FIG. 1 shows schematically a countermeasure device to protect a data link between two data storage elements, according to an embodiment.

FIG. 1 shows a data emitting unit REG1 and a data receiving unit REG2, linked by a data transmission link LNK, in an electronic component IC. The units REG1 and REG2 may be, for example, memories or registers. The link LNK is for example a data bus.

According to one embodiment, the electronic component IC comprises a countermeasure device comprising a scrambling unit SL, a descrambling unit DSL, and a control unit TMU of units SL and DSL. The unit SL is interposed on the link LNK on the output of the unit REG1, and the unit DSL is interposed on the link LNK on the input of the unit REG2.

Figure 2:
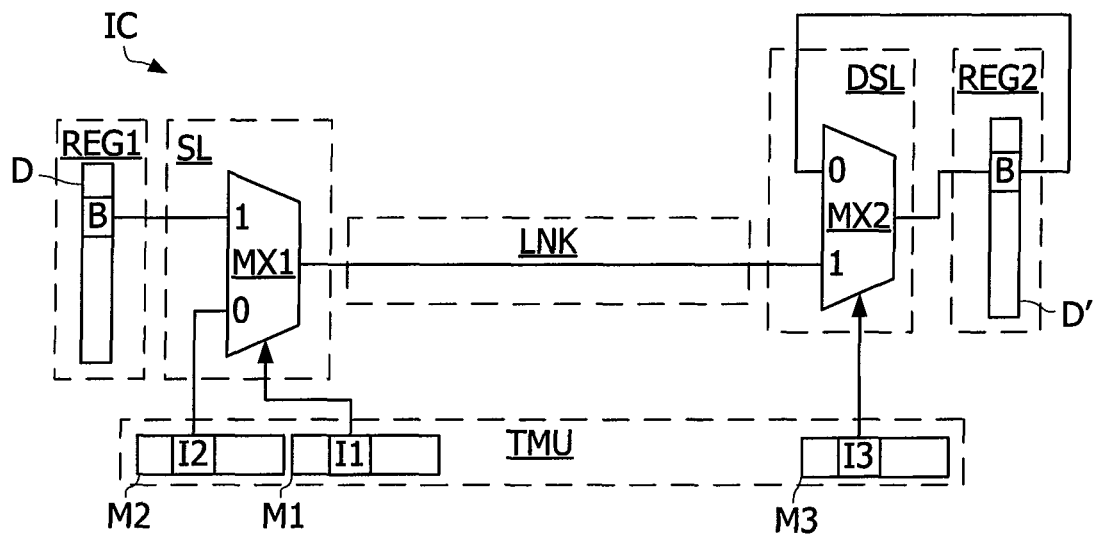
FIG. 2 shows schematically a data emitting part and a data receiving part of the countermeasure device, according to an embodiment.

FIG. 2 shows the scrambling unit SL and the descrambling unit DSL, according to an embodiment. Scrambling unit SL comprises, for each bit B of a data D stored in unit REG1 and to be transmitted by the link LNK or for each transmission line of the link LNK, a multiplexer MX1 controlled by a bit I1 of a first word of a random command M1 emitted by the control unit TMU. The multiplexer MX1 comprises one input linked to a memory cell of bit B in the unit REG1 and another input receiving a bit I2 of a second word of a random command M2 emitted by the control unit TMU. The output of the multiplexer MX1 is connected to a bit transmission line of the link LNK. In this manner, each bit B stored within the unit REG1 is randomly transmitted by the link LNK or else is replaced by a bit I2 of a random value that is transmitted instead of the bit B by the link LNK. The unit TMU generates the command words M1, M2, for example from a random or pseudo-random number RND.

The descrambling unit DSL comprises, for each bit transmission line of the link LNK or each memory cell of a bit of the unit REG2, a multiplexer MX2 controlled by a bit I3 of a third control word M3 emitted by the unit TMU. The multiplexer MX2 receives on one input the bit transmitted by the link LNK. Another input and the output of the multiplexer MX2 are linked to a memory cell of the bit of the unit REG2. In this manner, the multiplexer MX2 may be commanded to either store the bit B transmitted by the link LNK in a cell of the unit REG2, or else to supply the bit that was stored in the cell of the unit REG2.

The unit TMU commands the units SL and DSL to transmit, over several cycles, a data D stored in unit REG1. For each transmission cycle, unit TMU commands the multiplexers MX1 of unit SL by the bits I1 of the random word M1 to transmit a part, which was not already transmitted during a previous cycle, of bits B of the data D stored in unit REG1. More precisely, during a first cycle, the multiplexers MX1 of unit SL are commanded, by the bits I1 of a command word M1 emitted by unit TMU, to transmit a first part of bits B of the data D stored in unit REG1. The non-transmitted bits of the data D are replaced by bits I2 of the random word M2 emitted by unit TMU, which are transmitted by the link LNK. Similarly, the multiplexers MX2 of unit DSL are commanded by the bits I3 of word M3 emitted by unit TMU so that all the transmitted bits are stored in unit REG2. At the end of the first transmission cycle, the unit REG2 contains a data D' that comprises the first part of the transmitted bits of the data D and bits I2 of word M2.

If the transmission of a data is performed over two cycles, unit TMU emits, during the second and last cycle, a command word M1 to multiplexers MX1 of unit SL to transmit the bits of the data D that were not transmitted during the previous cycle. To this effect, each bit I1 of the command word M1 is equal to the inverse of the bit of the same rank of the command word M1 that was used to control the multiplexers MX1 during the previous transmission cycle. During the second cycle, the unit TMU emits a command word M3 to the multiplexers MX2 to transmit to the unit REG2 all the bits of the data D that were transmitted during this last cycle and to loop back to the input of unit REG2 all the bits of the data D that were transmitted during the previous cycle. To this effect, the command word M3 is equal to the command word M1 emitted during this last cycle.

In this manner, the transmission of a data is done with two random components: one random component relating to the choice of bits of the data transmitted during each transmission cycle, and one random component relating to the value of the transmitted bits instead of the non-transmitted bits of the data, during each transmission cycle. It results that not only is the electromagnetic or electric consumption signature of a data transmission spread over several transmission cycles, but also that the signature of each transmission cycle depends upon the value of the random bits I2, the rank of which in the transmitted data is also random.

Figure 3A:
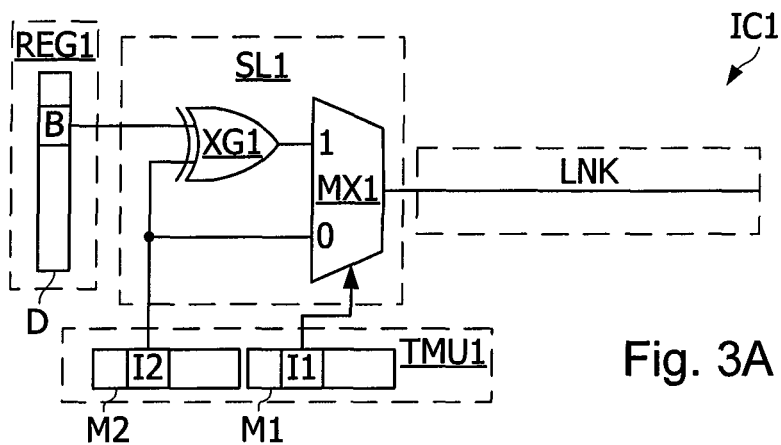
FIG. 3A shows schematically a data emitting part of the countermeasure device, according to another embodiment.
Figure 3B:
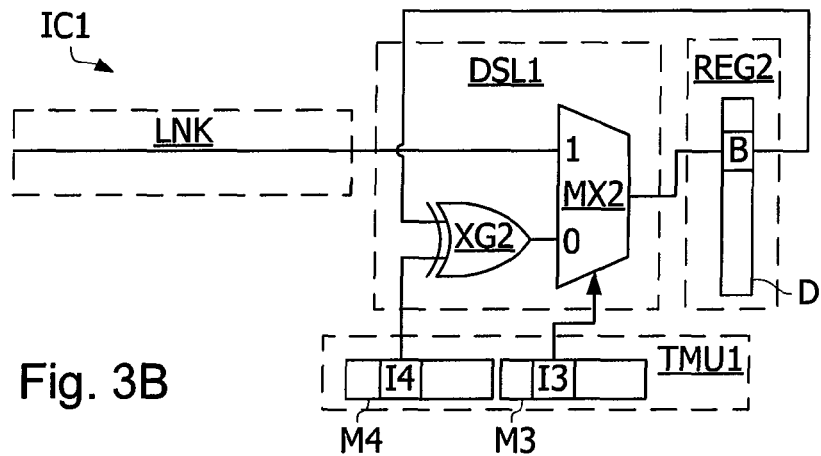
FIG. 3B shows schematically a data receiving part of the countermeasure device, corresponding to the emitting part of FIG. 3A.

FIGS. 3A and 3B show a countermeasure device according to another embodiment, comprising a scrambling unit SL1 and a descrambling unit DSL1 controlled by a control unit TMU1, to protect a data transmission link LNK in an electronic component IC1. In FIG. 3A, scrambling unit SL1 differs from the unit SL shown in FIG. 2 in that it comprises, for each bit B of a data stored by unit REG1 or to be transmitted by link LNK or each bit transmission line of the link LNK, a logic gate of the exclusive OR type (XOR) XG1 interposed between the output of unit REG1 and the input of multiplexer MX1. The gate XG1 thus receives on input the bit B of unit REG1, as well as a bit with a random value supplied by unit TMU1, for example chosen to be equal to the corresponding bit I2 of the command word M2. The output of the gate XG1 is connected to an input of the multiplexer MX1. The gate XG1 thus transmits to multiplexer MX1 a bit B of the data D, inverted or not depending on the value of bit I2.

In FIG. 3B, the descrambling unit DSL1 differs from the unit DSL shown in FIG. 2B in that it comprises, for each bit B of a data transmitted to the unit REG2 or each bit transmission link LNK, a logic gate of the exclusive OR type (XOR) XG2 arranged between the output and the input of the unit REG2. One input of the gate XG2 receives from the unit TMU1 a bit I4 of a command word M4. In this manner, a bit of data D transmitted in an inverted form during a first cycle may be inverted again during a following transmission cycle.

Figure 4A:
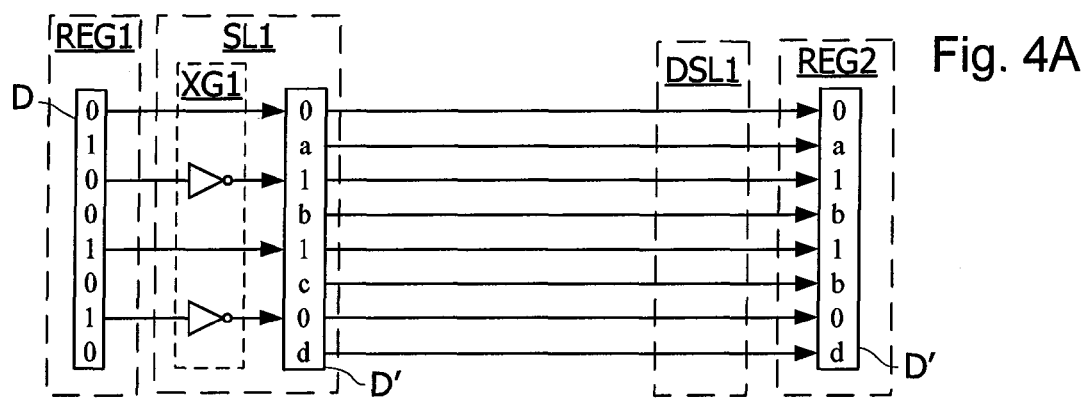
FIGS. 4A and 4B show schematically the state of the protection device during two transmission cycles of a data.
Figure 4B:
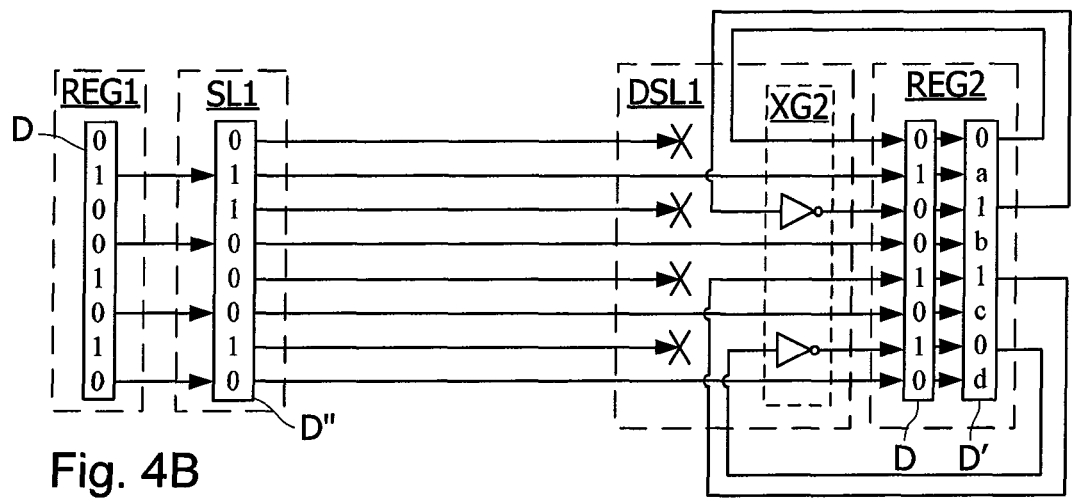

FIGS. 4A and 4B show a state example of a countermeasure device SL1, DSL1, TMU1 during two transmission cycles of a data D, in the case where the data is completely transmitted in two transmission cycles.

In FIG. 4A showing the countermeasure device during the first transmission cycle, the data D in the unit REG1 is for example equal to "01001010". The multiplexers MX1 of unit SL1 are controlled by a command word M1 equal to "10101010". The command word M2 supplied to unit SL1 is equal to "0a1b0c1d", a, b, c and d being bits with indifferent random values. The multiplexers MX2 of unit DSL1 are controlled by a command word M3 equal to "11111111" so that all the bits transmitted by the link LNK are transferred to unit REG2. The command word M4 supplied by unit TMU1 to unit DSL1 has an indifferent value that is not used because all the bits of the word M3 are at 1. It results that the first bit equal to 0 of the data D is transmitted to unit REG2 without change, the random value "a" is transmitted instead of the second bit of the data D, the third bit is transmitted in an inverted form equal to 1, the random value "b" is transmitted instead of the fourth bit, the fifth bit is transmitted without change, the random value "c" is transmitted instead of the sixth bit, the seventh bit is transmitted in an inverted form equal to 0, and the random value "d" is transmitted instead of the eighth bit. A data D' equal to "0a1b1c0d" is thus transmitted during the first cycle instead of the data D and is stored in the register REG2.

During the second and last transmission cycle shown by FIG. 4B, the multiplexers MX1 are controlled by a command word $\overline{M1}$ equal to the inverse of command word M1 supplied during the first transmission cycle, that is "01010101". In this manner, the bits of the data D not transmitted during the first transmission cycle may be transmitted during the second transmission cycle. The unit SL1 also receives the command word M2 emitted by the unit TMU1 during the first transmission cycle. It results that the bits of word M2 used to control the gates XG1 are transmitted instead of the bits of the data D that were transmitted during the first transmission cycle, with the result that a data D" equal to "01100010" is transmitted during the second transmission cycle. The multiplexers MX2 of unit DSL1 are controlled by a command word M3 equal to the command word M1 emitted during the second transmission cycle, so that all the bits, and only these bits, of the data D transmitted by the link LNK during this cycle are transferred in the unit REG2. The command word M4 supplied by unit TMU1 to unit DSL1 is equal to the command word M2 emitted during the first transmission cycle and during this transmission cycle, so that all the bits of the data D that were transmitted in an inverted form during the first cycle are again inverted before being sent to the input of the unit REG2. It results that the first bit equal to 0 in unit REG2 is reintroduced without change in unit REG2 instead of the first bit transmitted equal to 0 of the data D", the second bit equal to 1 of the data D is transmitted without change to unit REG2, the third bit equal to 1 in unit REG2 is reintroduced in an inverted form in unit REG2 instead of the third bit transmitted equal to 1 of the data D", the fourth bit equal to 0 is transmitted without change to unit REG2, the fifth bit equal to 1 in unit REG2 is reintroduced without change in unit REG2 instead of the fifth bit transmitted equal to 0 of the data D", the sixth bit equal to 0 is transmitted without change to unit REG2, the seventh bit equal to 0 in unit REG2 is reintroduced in an inverted form in unit REG2 instead of the seventh bit transmitted equal to 1 of the data D", and the eighth bit equal to 0 is transmitted without change to unit REG2. The data D is thus found in unit REG2 at the end of the second transmission cycle.

Besides the random components introduced in the embodiment of the FIG. 2, the embodiment of FIGS. 3A and 3B adds a double inversion of bits chosen randomly from among the bits of the transmitted data D, these two inversions being performed over two transmission cycles. This arrangement helps to further mask the signature emitted by the transmission of a data.

It should be noted that the bits not belonging to the data that are transmitted during the second cycle may be randomly chosen instead of corresponding to bits of the command word M2 emitted by the unit TMU1 during the first transmission cycle.

In the example shown in FIGS. 4A and 4B, half of the bits of the data D to transmit are transmitted during each of the two transmission cycles. Evidently, the number of bits transmitted each cycle is not necessarily constant, but may vary by one or several bits, keeping in mind that the masking of the signature of the data transmission is not optimized if all the bits of a data except for one or two bits are transmitted in one cycle. In practice, if the number of transmission cycles is equal to two, the number of bits of data transmitted during each cycle may be around half of the bits of the data. More generally, if n is the number of transmission cycles, the number of bits of data transmitted during each cycle may be around the number of bits of data divided by n.

Evidently, the countermeasure method described applies to data not necessarily comprising 8 bits as in the examples of FIGS. 4A and 4B, but may also be applied to data having a higher or lower number of bits.

Figure 5:
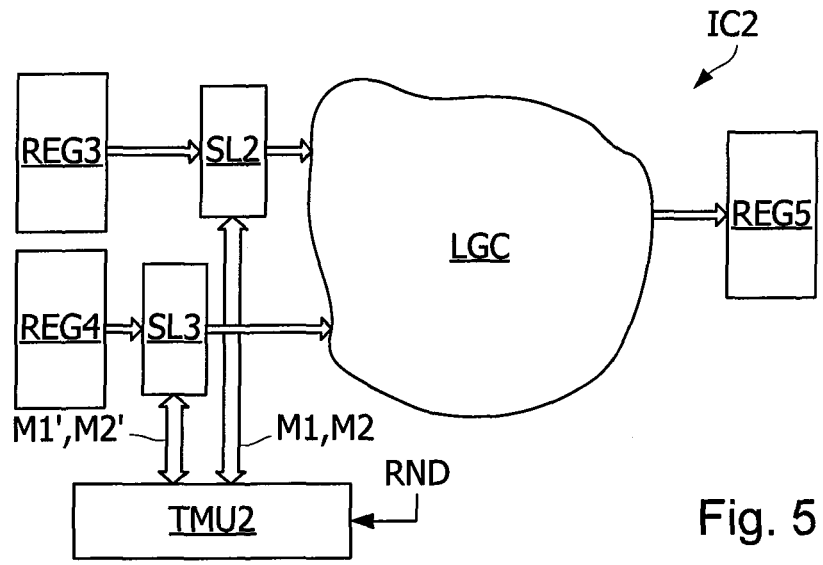
FIG. 5 shows schematically a countermeasure device to protect the data circulating in a combinatory logic circuit between two data storage units, according to an embodiment.

Certain mechanisms implemented in the previously described countermeasure devices may also be implemented to protect data circulating in a combinatory logic circuit. Thus, FIG. 5 shows an electronic component IC2 comprising a LGC associated on input to data storage units REG3, REG4 and on output to a storage unit REG5. The units REG3, REG4 and REG5 may be registers or data storage spaces in the memories. According to one embodiment, the electronic component IC2 comprises a countermeasure device comprising one scrambling unit SL2, SL3 per input unit REG4, REG5 of the input of circuit LCG and a control unit TMU2 controlling each scrambling unit SL2, SL3. The unit TMU2 is configured to control the units SL2, SL3 so as to replace, during a first transmission cycle performed by the circuit LCG, certain bits chosen randomly in the input units REG3, REG4, by bits of values also chosen randomly, and to transmit to the circuit LGC during one or several following cycles the bits of units REG3, REG4 not transmitted during the previous cycle (s), with the bits already transmitted during the previous cycle(s). All the bits of the data in the input units are thus transmitted simultaneously to circuit LGC during the last transmission cycle. In this manner, the logic gates of circuit LGC partially change state during each cycle instead of changing state in one cycle as a function of the values of data stored in the input registers.

To select the bits of data stored in the input units REG3, REG4 to transmit to the circuit LGC during each cycle, each of the scrambling units SL2, SL3 may be realized in conformance with the unit SL shown in FIG. 2. Each unit SL2, SL3 is controlled by a command word M1, M1' emitted by unit TMU2 to select the bits to emit of the data stored in the input unit to which it is connected. Each unit SL2, SL3 also receives a command word M2, M2' containing the bits to emit instead of the non-emitted bits of the data stored in unit SL2, SL3. The command words M1, M1' of the units SL2, SL3 may be identical or different. Equally, the number of bits of data selected during each cycle in each input unit REG3, REG4 (that is to say, the number of bits for example at 1 in the command words M1 and M'1) may be identical or different. Similarly, the random bits (belonging to the command words M2 and M2') transmitted instead of non-transmitted bits of units REG3, REG4 may be identical or different. Moreover, only certain data inputs of the logic circuit LGC may be equipped with a scrambling unit.

Figure 6:
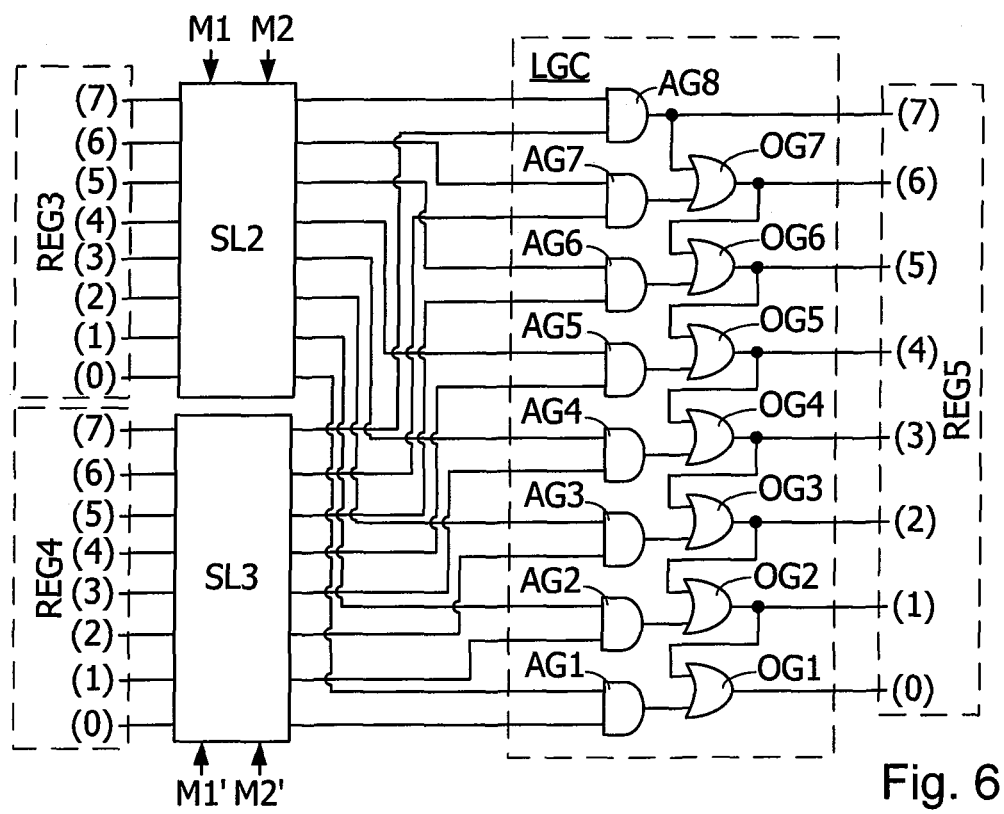
FIG. 6 shows an example of a logic circuit protected by the countermeasure device of FIG. 5.

FIG. 6 shows an example of a logic circuit LCG that may be protected by the previously described countermeasure device. The circuit LGC is linked to the input units REG3, REG4, for example of the 8-bit register type, by the intermediary of the scrambling units SL2, SL3. The circuit LGC is connected to the output unit REG5, also of the 8-bit register type.

The circuit LGC comprises eight logic gates of the AND type AG1-AG8 and seven logic gates of the OR type OG1-OG7. Each gate AG1-AG8 receives a bit from register REG3 and a bit of the same rank from register REG4. The output of each AND gate AGi is connected to a respective input of one of the OR gates OGi of the same rank i ("i" being a whole number varying between 1 and 7) and the output of the gate AG8 is connected to another input of the gate OG7. The output of each gate OGi supplies an output bit of the circuit LGC that is stored in the output unit REG5, the outputs of gates OG2 to OG7 being respectively connected to another input of gates OG6 to OG1.

At the beginning of a first calculation cycle, the registers REG3, REG4 contain for example the binary data "01001010" and "11100101". The command words M1 and M1' are for example equal to "11001100" and "01001010". It results that the data applied as input to circuit LGC are equal to: "01ab10cd" and "e1fg0h1j"; a, b, c, d, e, f, g, h, j being bits with random values from command words M2 and M2'. At the end of the first cycle, the register REG5 contains the word "11klmnop", k, l, m, n, o and p being bits calculated from the random values introduced by the units SL2 and SL3. During the second and last cycle, the words M1 and M1' are both equal to "11111111" such that all the bits stored in the registers REG3 and REG4 are introduced into the circuit LGC. At the end of the second cycle, the register REG5 contains the data "11000000". At the end of the first cycle, only certain logic gates of circuit LGC have reached their final state, whereas the other logical gates will not reach their final state until the end of the second cycle.

Here again, the number of transmission cycles of bits of input data to the logic circuit may be greater than two, and the number of bits of input data transmitted to the logic circuit during each cycle is not necessarily constant.

It will clearly appear to the skilled person that the present is susceptible to diverse implementation variations and applications. In particular, the disclosure is not limited to the circuits shown in the FIGS. 2, 3A and 3B implemented with the link LNK of FIG. 1 or the logic circuit of FIG. 5 or 6. All other types performing analog functions, that is to block a part of bits of one or more data to be transmitted, and to reconstitute the emitted data received during the last cycle, may suffice. Thus, the multiplexer MUX1 in FIGS. 2 and 3A may be replaced for example by a logic gate of the AND type, and the multiplexer MUX2 in FIGS. 2 and 3B may be replaced by a logic gate of the OR type. Bits at 0 are thus emitted instead of bits of a data D not emitted during each transmission cycle. During the last cycle, the OR gates reconstitute the data D by combining the bits emitted during this cycle with the bits emitted during the previous cycles. The multiplexer MUX1 in FIGS. 2 and 3A may also be replaced by a logic gate of the OR type, and the multiplexer MUX2 in FIGS. 2 and 3B may be replaced by a logic gate of the AND type. Bits at 1 are thus emitted instead of bits of a data D not emitted during each transmission cycle. During the last cycle, the AND gates reconstitute the data D by combing the bits emitted during this cycle with the bits emitted during the previous cycles.

The various embodiments described above can be combined to provide further embodiments. Aspects of the embodiments can be modified, if necessary to employ concepts of the various patents, application and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
transmitting binary data as a countermeasure for protecting data in an electronic component over plural transmission cycles comprising a first transmission cycle and a last transmission cycle, wherein the transmitting comprises during the first transmission cycle:
randomly selecting bits of the binary data, positions of the selected bits in the binary data being random;
modifying the binary data by replacing the selected bits with bits each having a randomly chosen value, and transmitting the modified binary data to a data storage unit; and
during the last transmission cycle, transmitting bits of the binary data that have not been transmitted during a previous transmission cycle, wherein the method includes:
randomly selecting a subset of bits from the selected bits;
inverting the randomly selected subset of bits; and
in the last transmission cycle, reinverting the randomly selected subset of inverted bits.

2. The method of claim 1 further comprising transmitting the binary data to a data input of a combinatory logic circuit of the electronic component, the last transmission cycle comprising transmitting all of the bits of the binary data to the combinatory logic circuit.

3. The method of claim 1 wherein the binary data are transmitted by a transmission line of the electronic component the last transmission cycle comprising transmitting modified binary data comprising bits of the data not transmitted during a previous cycle and bits having a randomly chosen value.

4. The method of claim 1 wherein a total number of transmission cycles is equal to two and a number of bits of the binary data transmitted during each cycle is half of a total number of bits of the binary data.

5. A device comprising:
a first data storage unit; and
scrambling circuitry, which, in operation, transmits binary data from the first storage unit to a second storage unit over plural transmission cycles and, in a first transmission cycle:
randomly selects bits of the binary data to be transmitted from the first storage unit, positions of the selected bits in the binary data being random;
modifies the binary data by replacing the selected bits with bits each having a randomly chosen value; and
transmits the modified binary data to the second data storage unit, wherein, in operation, the scrambling circuitry transmits in a last transmission cycle bits of the binary data that have not been transmitted during a previous transmission cycle, and wherein, in operation, the scrambling circuitry:

randomly selects a subset of bits from the selected bits; and inverts the randomly selected subset of bits, wherein, in the last transmission cycle, the randomly selected subset of inverted bits are reinverted.

6. The device of claim 5, wherein the scrambling circuitry is operably connected to the second storage unit via a combinatory logic circuit and, in operation, transmits all of the bits of the binary data to the combinatory logic circuit in the last transmission cycle.

7. The device of claim 5 wherein the scrambling circuitry is operably connected to a data transmission line, and, in operation, transmits in the last transmission cycle modified binary data comprising bits of the binary data not transmitted during a previous cycle and bits having a randomly chosen value.

8. The device of claim 5, further comprising:
descrambling circuitry operably integrated therein and which, in operation, receives bits transmitted by a data transmission line and reconstitutes a binary data from bits transmitted over several transmission cycles; and
a controller of the scrambling and descrambling circuitry, said controller operably coupled to the scrambling and descrambling circuitry.

9. An electronic component comprising:
a data transmission line; and
countermeasure circuitry operably connected to the data transmission line, which, in operation:
transmits binary data as a countermeasure for protecting data in the electronic component over several transmission cycles comprising a first transmission cycle and last transmission cycle, wherein the countermeasure circuitry comprises scrambling circuitry which, in the first transmission cycle:
randomly selects bits of the binary data to be transmitted, positions of the selected bits in the binary data being random;
modifies the binary data by replacing the selected bits with bits each having a randomly chosen value; and
transmits the modified binary data to a data storage unit; and
wherein the countermeasure circuitry, in the last transmission cycle, transmits bits of the binary data that have not been transmitted during a previous cycle, and wherein, in operation, the countermeasure circuitry:
randomly selects a subset of bits from the selected bits;
inverts the randomly selected subset of bits; and
in the last transmission cycle, reinverts the randomly selected subset of inverted bits.

10. The electronic component of claim 9, wherein the countermeasure circuitry comprises descrambling circuitry connected to the data transmission line which, in operation, receives bits transmitted by a data transmission line and reconstitutes a binary data from bits transmitted over several transmission cycles.

11. The electronic component of claim 9, further comprising a combinatory logic circuit having a data input, the scrambling circuitry being connected to the data transmission line and the data input of the combinatory logic circuit, to transmit all of the bits of the binary data to the combinatory logic circuit in the last transmission cycle.

12. The electronic component of claim 9, wherein the scrambling circuitry, in operation, transmits in the last transmission cycle modified binary data comprising bits of the binary data not transmitted during a previous cycle and bits having a randomly chosen value.

13. A portable microcircuit device comprising:
a data transmission line of the portable microcircuit device; and
countermeasure circuitry of the portable microcircuit device operably connected to the data transmission line, which, in operation:
transmits on the data transmission line binary data as a countermeasure for protecting data in an electronic component over several transmission cycles comprising a first transmission cycle and last transmission cycle, and, in the first transmission cycle:
randomly selects bits of the binary data to be transmitted, positions of the selected bits in the binary data being random;
modifies the binary data by replacing the selected bits with bits each having a randomly chosen value, and
transmits the modified binary data to a data storage unit; and
wherein in the last transmission cycle the countermeasure circuitry transmits bits of the binary data that have not been transmitted during a previous cycle, and wherein, in operation, the countermeasure circuitry:
randomly selects a subset of bits from the selected bits;
inverts the randomly selected subset of bits; and
in the last transmission cycle, reinverts the randomly selected subset of inverted bits.

14. The portable microcircuit device of claim 13, wherein the countermeasure circuitry comprises:
scrambling circuitry connected to the data transmission line; and descrambling circuitry connected to the data transmission line.

15. The portable microcircuit device of claim 13, further comprising:
a combinatory logic circuit having a data input; and
scrambling circuitry connected to the data transmission line and the data input of the combinatory logic circuit.

16. A device, comprising:
a data input line;
descrambling control circuitry operably coupled to the data input line, which, in operation, reconstitutes transmitted data from bits received over several transmission cycles, said bits having been scrambled over several transmission cycles, wherein a first transmission cycle of the transmission cycles comprises:
randomly selecting bits of binary data, positions of the selected bits in the binary data being random;
modifying the binary data by replacing the selected bits with bits each having a randomly chosen value; and
randomly selecting a subset of bits from the selected bits;
inverting the randomly selected subset of bits; and
transmitting the modified binary data to a data storage unit; and
wherein a last transmission cycle includes transmitting bits of the binary data that have not been transmitted during a previous cycle and reinverting the randomly selected subset of inverted bits.

17. The device of claim 16 wherein a total number of transmission cycles of the transmission cycles is equal to two and a number of bits of the binary data transmitted during each cycle is half of a total number of bits of the binary data.

* * * * *